United States Patent
Zhao (10) Patent No.: US 11,128,684 B2
(45) Date of Patent: Sep. 21, 2021

(54) METHOD AND APPARATUS FOR SCHEDULING SERVICE

(71) Applicant: Wangsu Science & Technology Co., Ltd., Shanghai (CN)

(72) Inventor: Rui Zhao, Shanghai (CN)

(73) Assignee: Wangsu Science & Technology Co., Ltd., Shanghai (CN)

( * ) Notice: Subject to any disclaimer, the term of this patent is extended or adjusted under 35 U.S.C. 154(b) by 0 days.

(21) Appl. No.: 16/726,115

(22) Filed: Dec. 23, 2019

(65) Prior Publication Data

US 2020/0137131 A1   Apr. 30, 2020

Related U.S. Application Data

(63) Continuation of application No. PCT/CN2018/081867, filed on Apr. 4, 2018.

(30) Foreign Application Priority Data

Jul. 14, 2017 (CN) .......................... 201710576106.X (51) Int. Cl.
*H04L 29/06* (2006.01)
*G06F 7/58* (2006.01)
(Continued)

(52) U.S. Cl.
CPC ............ *H04L 65/4084* (2013.01); *G06F 7/58* (2013.01); *G06N 3/08* (2013.01); *H04L 41/06* (2013.01); *H04L 41/145* (2013.01); *H04L 67/32* (2013.01)

(58) Field of Classification Search
CPC ... H04L 65/4084; H04L 41/06; H04L 41/145; H04L 67/32; G06F 7/58; G06N 3/08
See application file for complete search history.

(56) References Cited

U.S. PATENT DOCUMENTS 9,549,043 B1 * 1/2017 Stoica .................... H04W 4/021
2007/0072618 A1 * 3/2007 Freytsis .............. H04L 67/1002
455/452.2
(Continued)

FOREIGN PATENT DOCUMENTS

CN  101694652 A  4/2010
CN  103051546 A  4/2013
(Continued)

OTHER PUBLICATIONS

International Search Report, PCT/CN2018/081867, dated Jun. 20, 2018, 4 pgs.
(Continued)

*Primary Examiner* — Jerry B Dennison
(74) *Attorney, Agent, or Firm* — USCH Law, PC (57) ABSTRACT

The present disclosure discloses a method and an apparatus for scheduling a service. The method includes: obtaining a first configuration status, the first configuration status being a current configuration status of a network resource in a whole CDN when a preset scheduling trigger event is detected; generating a first substitute resource list according to the first configuration status using a trained service scheduling model, where at least one substitute resource and a weight corresponding to each of the at least one substitute resource are recorded in the first substitute resource list; selecting a first substitute resource in the first substitute resource list according to the weight corresponding to each of the at least one substitute resource and a preset first selection policy; and performing service scheduling in the whole CDN based on the first substitute resource.

18 Claims, 5 Drawing Sheets

(51) Int. Cl.
*G06N 3/08* (2006.01)
*H04L 12/24* (2006.01)
*H04L 29/08* (2006.01)

(56) References Cited

U.S. PATENT DOCUMENTS

| | | | | |
|---|---|---|---|---|
| 2008/0215409 | A1* | 9/2008 | Van Matre | G06Q 10/0631 705/7.12 |
| 2009/0307215 | A1* | 12/2009 | Ball | G06F 16/9535 |
| 2013/0013730 | A1 | 1/2013 | Li et al. | |
| 2014/0068076 | A1* | 3/2014 | Dasher | H04L 65/4076 709/226 |
| 2015/0012656 | A1* | 1/2015 | Phillips | H04L 41/509 709/226 |
| 2015/0249615 | A1* | 9/2015 | Chen | G06F 9/45558 709/226 |
| 2016/0283304 | A1* | 9/2016 | Horikawa | G06F 11/3409 |
| 2018/0293111 | A1* | 10/2018 | Chen | G06F 9/5083 |
| 2020/0137131 | A1* | 4/2020 | Zhao | G06N 3/006 |

FOREIGN PATENT DOCUMENTS

| | | | |
|---|---|---|---|
| CN | 103117876 | A | 5/2013 |
| CN | 103167028 | A | 6/2013 |
| CN | 103412875 | A | 11/2013 |
| CN | 104320487 | A | 1/2015 |
| CN | 105956661 | A | 9/2016 |
| CN | 106713265 | A | 5/2017 |
| CN | 106940801 | A | 7/2017 |
| CN | 107231436 | A | 10/2017 |
| WO | WO 2007/016707 | A2 | 2/2007 |
| WO | WO 2013/189024 | A1 | 12/2013 |
| WO | WO 2015/179778 | A1 | 11/2015 |

OTHER PUBLICATIONS

Mariette Awad, et al., Efficient Learning Machines, 2015, 263 pages, Apress Media LLC.
Hongzi Mao, et al., Resource Management with Deep Reinforcement Learning, 2016, 7 pages, ACM, USA.
Luis C. Rabelo, et al., Development of a Real-Time Learning Scheduler, 1994, 6 pages, IEEE, USA.
Wangsu Science & Technology Co., Ltd., CN Patent Application No. 201710576106.X, Office Action, dated Apr. 24, 2019.
Wangsu Science & Technology Co., Ltd., EP Patent Application No. 18832346.3, European Search Report, dated Jun. 8, 2020.

* cited by examiner

METHOD AND APPARATUS FOR SCHEDULING SERVICE

CROSS REFERENCE TO RELATED APPLICATIONS

The present disclosure is a continuation of PCT patent application No. PCT/CN2018/081867, entitled "METHOD AND APPARATUS For SCHEDULING SERVICE," filed Apr. 4, 2018, which claims priority to CN patent application No. 01710576106.X, entitled "METHOD AND APPARATUS For SCHEDULING SERVICE," filed Jul. 14, 2017, each which is incorporated into the present disclosure by reference in its entirety.

TECHNICAL FIELD

The present disclosure relates to network data transmission, and in particular, to a method and an apparatus for scheduling a service.

BACKGROUND

A content delivery network (CDN) is a network formed by disposing a node server (which may be referred to as a network node) between a service provider and a consumer. Through the network, a user may obtain required content from the network node nearby, thereby alleviating network congestion and improving a speed at which the user accesses a web site.

When a network node continuously operates in an overload state, or a network fluctuates abnormally, a CDN management technician needs to schedule a portion of services in a whole CDN, that is, select a better substitute resource to transfer the portion of the services to the substitute resource for processing.

During implementation of the present disclosure, the inventor found at least the following problems in existing technologies.

During selection of a substitute resource, a technician needs to manually calculate a network resource configuration status, for example, a load status, a network status, a physical location, a service redundancy, and the like, of each network node, and then analyzes and processes the configuration status to select an optimal substitute resource. In this case, service scheduling is inefficient in that a large amount of manual work is required.

SUMMARY

In order to resolve the problem in the existing technologies, embodiments of the present disclosure provide a method and an apparatus for scheduling a service. The technical solutions are as follows.

A first aspect of the present disclosure provides a method for scheduling a resource, which includes:

obtaining a current configuration status of a network resource in a whole CDN when a preset scheduling trigger event is detected, where the current configuration status of the network resource in the whole CDN is referred to as a first configuration status;

generating a first substitute resource list according to the first configuration status using a trained service scheduling model, where at least one substitute resource and a weight corresponding to each of the at least one substitute resource are recorded in the first substitute resource list;

selecting a first substitute resource in the first substitute resource list according to the weight corresponding to each of the at least one substitute resource and a preset first selection policy; and performing service scheduling in the whole CDN based on the first substitute resource.

Optionally, the method further includes:

obtaining a current configuration status of a network resource in a CDN test environment when a preset scheduling trigger event is detected in the CDN test environment, where the CDN test environment is a local CDN and/or a whole virtual CDN and the current configuration status of the network resource in the CDN test environment is referred to as a second configuration status; and training an initial service scheduling model based on the second configuration status to adjust a parameter of the initial service scheduling model.

Optionally, the training an initial service scheduling model based on the second configuration status to adjust a parameter of the initial service scheduling includes:

generating a second substitute resource list using the initial service scheduling model according to the second configuration status;

selecting a second substitute resource in the second substitute resource list according to the preset first selection policy, and performing service scheduling in the CDN test environment based on the second substitute resource;

rating a configuration status of a network resource in the CDN test environment after the service scheduling using a preset network rating standard to obtain a first rating result, where the configuration status of the network resource in the CDN test environment after the service scheduling is referred to as a third configuration status; and adjusting the parameter of the initial service scheduling model using a back propagation algorithm according to the first rating result.

Optionally, after the performing service scheduling in the whole CDN, the method further includes:

rating a configuration status of a network resource in the whole CDN after the service scheduling using the preset network rating standard to obtain a second rating result, where the configuration status of the network resource in the whole CDN after the service scheduling is referred to as a fourth configuration status; and adjusting a parameter of the service scheduling model using the back propagation algorithm according to the second rating result.

Optionally, the obtaining a current configuration status of a network resource in a whole CDN when a preset scheduling trigger event is detected includes:

determining a scheduling trigger probability using a trained fault alarming model when an abnormality is detected in a status parameter of a first network resource in the whole CDN; and generating a random number between 0 and 1, and obtaining the current configuration status of the network resource in the whole CDN when the random number is less than or equal to the scheduling trigger probability.

Optionally, the method further includes:

calculating and establishing a fault alarming model in a Markov chain form according to historical fault alarm data of the whole CDN.

A second aspect of the present disclosure provides an apparatus for scheduling a resource, which includes:

an obtaining module configured to obtain a current configuration status of a network resource in a whole CDN when a preset scheduling trigger event is detected, where the current configuration status of the network resource in the whole CDN is referred to as a first configuration status,;

a generating module configured to generate a first substitute resource list according to the first configuration status using a trained service scheduling model, where at least one substitute resource and a weight corresponding to each of the at least one substitute resource are recorded in the first substitute resource list;

a selecting module configured to select a first substitute resource in the first substitute resource list according to the weight corresponding to each of the at least one substitute resource and a preset first selection policy; and a scheduling module configured to perform service scheduling in the whole CDN based on the first substitute resource.

Optionally, the obtaining module is further configured to obtain a current configuration status of a network resource in a CDN test environment when a preset scheduling trigger event is detected in the CDN test environment, where the CDN test environment is a local CDN and/or a whole virtual CDN and the current configuration status of the network resource in the CDN test environment is referred to as a second configuration status; and the apparatus further includes a training module configured to train an initial service scheduling model based on the second configuration status to adjust a parameter of the initial service scheduling model.

Optionally, the training module is configured to:

generate the second substitute resource list using the initial service scheduling model according to the second configuration status;

select a second substitute resource in the second substitute resource list according to the preset first selection policy, and perform service scheduling in the CDN test environment based on the second substitute resource;

rate a configuration status of a network resource in the CDN test environment after the service scheduling using a preset network rating standard to obtain a first rating result, where the configuration status of the network resource in the CDN test environment after the service scheduling is referred to as a third configuration status; and adjust the parameter of the initial service scheduling model using a back propagation algorithm according to the first rating result.

Optionally, the apparatus further includes:

a rating module configured to: after the service scheduling is performed in the whole CDN, rate a configuration status of a network resource in the whole CDN after the service scheduling using a preset network rating standard to obtain a second rating result, where the configuration status of the network resource in the whole CDN after the service scheduling is referred to as a fourth configuration status; and an adjusting module configured to adjust a parameter of the service scheduling model using a back propagation algorithm according to the second rating result.

Optionally, the obtaining module is configured to:

determine a scheduling trigger probability using a trained fault alarming model when an abnormality is detected in a status parameter of a first network resource in the whole CDN; and generate a random number between 0 and 1, and obtain the current configuration status of the network resource in the whole CDN when the random number is less than or equal to the scheduling trigger probability.

Optionally, the apparatus further includes:

an establishing module configured to calculate and establish a fault alarming model in a Markov chain form according to historical fault alarm data of the whole CDN.

A third aspect of the present disclosure provides a management device, which includes a processor and a memory storing at least one instruction, at least one program, a code set or an instruction set that are loaded and executed by the processor to perform the method for scheduling a service according to the first aspect.

A fourth aspect of the present disclosure provides a computer readable storage medium, where the computer readable storage medium stores at least one instruction, at least one program, a code set, or an instruction set that are loaded and executed by a processor to perform the method for scheduling a service according to the first aspect.

Beneficial effects of the technical solutions in the embodiments of the present disclosure are as follows.

In the embodiments of the present disclosure, the current configuration status of a network resource in the whole CDN is obtained when the preset scheduling trigger event is detected, where the current configuration status of the network resource in the whole CDN is referred to as the first configuration status, the first substitute resource list is generated according to the first configuration status using the trained service scheduling model, where the at least one substitute resource and the weight corresponding to each of the at least one substitute resource are recorded in the first substitute resource list, the first substitute resource is selected in the first substitute resource list according to the weight corresponding to each of the at least one substitute resource and the preset first selection policy, and the service scheduling is performed in the whole CDN based on the first substitute resource. In this way, through continuous learning on a service scheduling process and a service scheduling result feedback, the management device can understand and master selection of a substitute resource, so that inaccuracy, maintenance difficulty, cost fluctuation, and the like, which are caused by manually specifying a scheduling rule are avoided. In addition, during service scheduling, the management device directly selects an optimal substitute resource through the service scheduling model without a need of a large amount of manual work, so that efficiency of the service scheduling can be improved.

BRIEF DESCRIPTION OF THE DRAWINGS

To describe technical solutions in embodiments of the present disclosure more clearly, the following briefly describes accompanying drawings for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

To make objectives, technical solutions, and advantages of the present disclosure clearer, the following further describes the embodiments of the present disclosure in detail with reference to accompanying drawings.

An embodiment of the present disclosure provides a method for scheduling a service. The method is performed by a management device in a whole CDN. The management device is configured to monitor a configuration status of a network resource in the whole CDN and perform service scheduling in the whole CDN based on the configuration status. The management device may be an independent server dedicated for management, or may be a node server supporting a network service in the whole CDN. The management device in this embodiment may be implemented by an independent device or may be jointly implemented by a device group consisting of a plurality of devices. The management device may include a processor, a memory, and a transceiver. The processor may be configured to process service scheduling in the following process, the memory may be configured to store data required and generated during the following processing, and the transceiver may be configured to receive and send relevant data during the following processing. In this embodiment, that the management device is an independent management device in the whole CDN is taken as an example, and other situations are similar.

Figure 1:
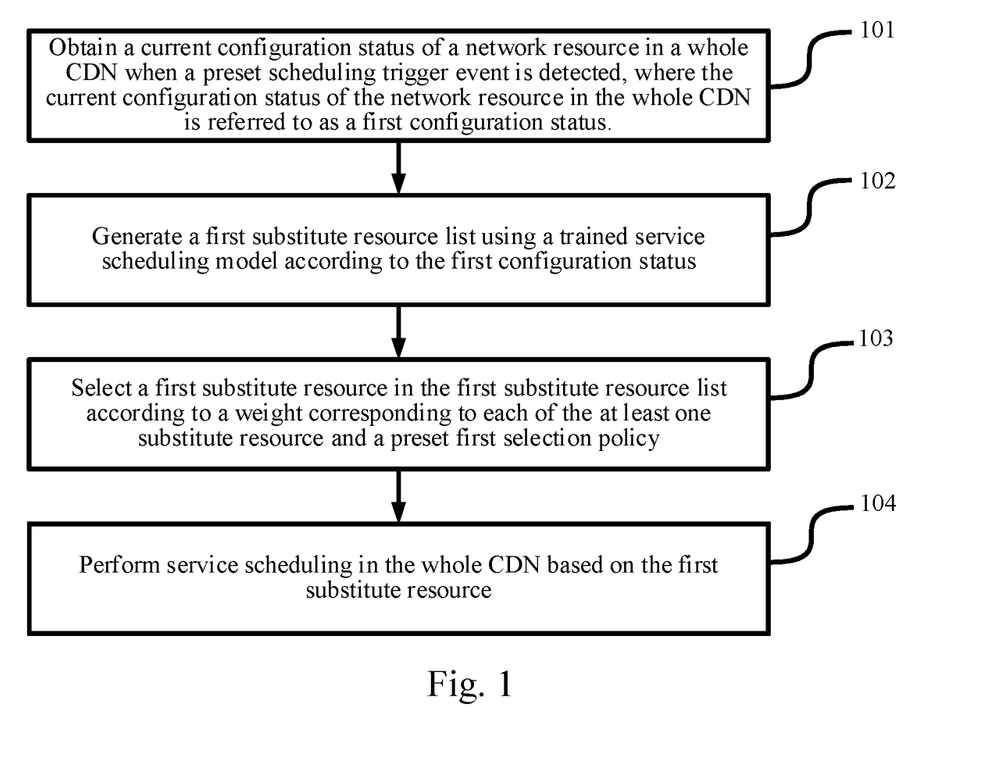
FIG. 1 is a flowchart of a method for scheduling a service according to an embodiment of the present disclosure.

A processing process shown in FIG. 1 is described in detail with reference to specific embodiments. Content may be as follows.

Step 101: a current configuration status of a network resource in a whole CDN is obtained when a preset scheduling trigger event is detected, where the current configuration status of the network resource in the whole CDN is referred to as a first configuration status.

The whole CDN is an on-line whole resource environment providing a CDN acceleration service. A network resource may be a processing resource of a network node and/or a transmission resource of a transmission line. The configuration status of the network resource may include CPU utilization rate, a service redundancy, input and output values of each network node and bandwidth usage rate, a response time, and a packet loss rate of transmission lines between network nodes.

During implementation, a CDN management technician may preset, in a management device, a scheduling trigger event for performing service scheduling. The scheduling trigger event may include fault prediction alarming for the whole CDN, occurrence of a human-registered fault, and arrival of a trigger time by a timed scheduling task, and the like. In this way, the management device may determine whether to perform service scheduling processing by monitoring in real time whether the scheduling trigger event occurs. When the preset scheduling trigger event is detected, a current configuration status of a network resource in the whole CDN may be obtained first, where the current configuration status of the network resource in the whole CDN is referred to as the first configuration status. Certainly, in a specific case, as a service scheduling rule varies, merely a configuration status of partial network resources associated with the service scheduling in the whole CDN may be obtained. For example, when a network node continuously operates in an overload state, and a service on the network node needs to be scheduled, merely configuration statuses of network resources on the network node and a nearby network node and on a transmission line between the network node and the nearby network node may be obtained. Subsequent obtaining of a configuration status of a network resource is specifically processed as described herein, and details are not enumerated again.

Optionally, the service scheduling may be triggered in advance using a fault alarming model. Correspondingly, processing of step 101 may be as follows: a scheduling trigger probability is determined using a trained fault alarming model when an abnormality is detected in a status parameter of a first network resource in the whole CDN, and a random number between 0 and 1 is generated, and the current configuration status of the network resource in the whole CDN is obtained when the random number is less than or equal to the scheduling trigger probability.

During implementation, the fault alarming model for predicting a fault in the whole CDN may be preset in the management device. The fault alarming model may be used to predict a probability of fault occurrence and service scheduling based on a bottom-level machine indicator (that is, a status parameter of a network resource) in the whole CDN. If the probability is relatively high, scheduling is triggered at a relatively high probability. In particular, the management device may obtain a status parameter of a network device in the whole CDN, and the scheduling trigger probability may be determined using the trained fault alarming model when an abnormality is detected in the status parameter of the first network resource in the whole CDN. Then the random number between 0 and 1 may be generated. The random number is then compared to the scheduling trigger probability. When the random number is less than or equal to the scheduling trigger probability, the service scheduling is triggered, so that the management device may obtain the current configuration status of the network resource in the whole CDN, where the current configuration status of the network resource in the whole CDN is referred to as the first configuration status. The processing may be specifically implemented using the following formula:

$$y = \begin{cases} 1, & \text{if } \pi(t) \le P \\ 0, & \text{else} \end{cases}$$

y=1 means to trigger service scheduling, and y=0 means not to trigger service scheduling. P is the scheduling trigger probability determined using the fault alarming model, and $\pi(t)$ is a random number between 0 and 1 randomly generated at time t. If the random number is less than or equal to P, y=1. Otherwise, y=0.

Optionally, the fault alarming model may be trained as follows: the fault alarming model is calculated and established in a Markov chain form according to historical fault alarm data of the whole CDN.

During implementation, the management device may establish the fault alarming model according to recent historical fault alarm data of the whole CDN, and continuously update the fault alarming model based on fault alarm data generated in real time in the whole CDN. The historical fault alarm data is generated from a status parameter abnormality to actual service scheduling triggering through monitoring on each node server in the whole CDN. The management device may set a rule for transformation of a status parameter abnormality to actual service scheduling triggering (which is also referred to as a rule for transformation of a bottom-level machine indicator abnormality alarm to a high-level alarm) based on the historical fault alarm data. For example, on the basis of a time sequence, the high-level alarm is generated based on the bottom-level indicator abnormality alarm, and the high-level alarm is related to only a direct next-level alarm. Therefore, the Markov chain may be used for calculation:

$$P(X_{n+1}=x|X_1=x_1,X_2=x_2,\ldots,X_n=x_n)= P(X_{n+1}=x|X_n=x_n)$$

The Markov chain is a sequence of random variables with a Markov property that is used to describe a status sequence. Each status value depends on a finite number of previous states. A range of the random variables is represented by a set of all possible values of the random variables, and is referred to as "a status space". In particular, in this embodiment, a random variable $X_n$ represents a state at a time n, and $X_{n+1}$ is merely a function of $X_n$. Further, the management device may calculate the fault alarming model in the Markov chain form according to the historical fault alarm data of the whole CDN. In this way, through analysis on the status parameter of the network resource, an association relationship between a status parameter abnormality and service scheduling triggering is established. During detection of a change of the status parameter, a subsequent fault is predicted, so that pre-scheduling can be implemented, thereby ensuring service quality and user experience to a specific extent.

Step 102: a first substitute resource list is generated using the trained service scheduling model according to the first configuration status.

At least one substitute resource and a weight corresponding to each of the at least one substitute resource are recorded in the first substitute resource list.

During implementation, the management device may pre-store a service scheduling model after a large amount of learning and training. The service scheduling model may be a deep reinforcement learning model established in large-scale discrete state-action space, and iterative learning is performed through sample training. Traditional reinforcement learning is an algorithm for resolving a problem of the discrete state-action space. However, when discrete state space and action space are excessively large, it is quite difficult to effectively handle the cases through traditional reinforcement learning. The deep reinforcement learning model includes two machine learning methods: reinforcement learning and deep learning which are combined, and can support a learning task in the large-scale discrete state-action space, and is applicable to service scheduling in this embodiment. For specific model training, refer to the following descriptions.

After obtaining the current configuration status of the network resource in the whole CDN, where the current configuration status of the network resource in the whole CDN is referred to as the first configuration status, the management device may obtain a status vector of the current whole network resource configuration based on the first configuration status, and then calls the trained service scheduling model, and uses the status vector as input of the service scheduling model to perform calculation using a forward propagation algorithm at a hidden layer of the service scheduling model, so that a first substitute resource list (which may also be understood as a substitute resource probability list) may be obtained from an output layer of the service scheduling model. At least one substitute resource and a weight corresponding to each of the at least one substitute resource are recorded in the first substitute resource list. The weight herein may be understood as a selection weight corresponding to each substitute resource.

Step 103: a first substitute resource is selected in the first substitute resource list according to a weight corresponding to each of the at least one substitute resource and a preset first selection policy.

During implementation, after obtaining the first substitute resource list using the service scheduling model, the management device may select the first substitute resource in the first substitute resource list according to a weight corresponding to each substitute resource recorded in the first substitute resource list and the preset first selection policy, that is, select an optimal substitute resource. It should be noted that the preset first selection policy is used for training the service scheduling model, and a type of the first selection policy is not specifically limited herein. A management technician may select a selection policy according to an actual condition, for example, a greedy policy, that is, select, as the first substitute resource, a corresponding substitute resource with a highest weight in the first substitute resource list, or may select N substitute resources with the highest weight first, and then randomly select the first substitute resource from the N substitute resources.

Step 104: perform service scheduling in the whole CDN based on the first substitute resource.

During implementation, after selecting the first substitute resource in the first substitute resource list, the management device may perform service scheduling in the whole CDN based on the first substitute resource, that is, perform a corresponding service using the first substitute resource.

Optionally, before performing service scheduling in the whole CDN using the service scheduling model, the management device may adjust a parameter of the service scheduling model first in a CDN test environment as follows: a current configuration status of a network resource in the CDN test environment is obtained when a preset scheduling trigger event is detected in the CDN test environment, where the current configuration status of the network resource in the CDN test environment is referred to as the second configuration status, and an initial service scheduling model is trained based on the second configuration status to adjust the parameter of the initial service scheduling model.

The CDN test environment is a local CDN and/or a whole virtual CDN.

During implementation, the management device may establish a CDN test environment for training the service scheduling model. In the CDN test environment, the initial service scheduling model may be iteratively trained based on various scheduling trigger events to obtain a relatively mature service scheduling model. Specific processing may be as follows. When a preset scheduling trigger event is detected in the CDN test environment, the management device may obtain the current configuration status of the network resource in the CDN test environment, where the current configuration status of the network resource in the CDN test environment is referred to as the second configuration status, and then train the initial service scheduling model based on the second configuration status to adjust the parameter of the initial service scheduling model.

The CDN test environment may be a local CDN and/or a whole virtual CDN. On the one hand, the local CDN is intended to plan a small-scale test environment in the whole CDN environment, so that a negative impact generated by the service scheduling model during training can be controlled to be within a relatively range extent in the local network. Therefore, an impact on service quality and costs of the whole CDN can be effectively reduced. The local network may be divided according to a physical location of a network node, an operator to which a service belongs, or a user level, and the like. On the other hand, the whole virtual CDN may be a network environment virtualized according to a real whole CDN. The network environment can interact with a service scheduling system, and can simulate the real whole CDN to respond to a scheduling result according to the scheduling result. In addition, the scheduling trigger event may be simply simulated by a cellular automaton model.

It is easily found that training the service scheduling model based on the whole virtual CDN has the following advantages compared to the local CDN. First, the local CDN is a real network environment, in which scheduling can be performed only after a scheduling trigger event occurs, so as to accumulate training data. In this case, model training requires a relatively long time period. However, for the whole virtual CDN, the scheduling trigger event may be simulated by a cellular automaton, so that a time period required for model training can be greatly shortened. Secondly, the local CDN is a subset environment planned in the whole CDN to reduce the negative impact of the service scheduling model on on-line service quality and costs during training. Although the subset environment can be used to control the negative impact to be within a relatively small range, the negative impact cannot be completely eliminated. In addition, since the local CDN is a subset environment of the whole CDN, data generated in the subset environment for model training is a local data set that may differ greatly from a global data set of the whole CDN in data distribution. In this case, over-fitting may occur on the trained service scheduling model, and therefore the trained service scheduling model cannot be generalized to an environment of the whole CDN. However, any processing in the virtual CDN does not affect the whole real CDN. In addition, the virtual CDN simulates the whole real CDN environment, so that a data limitation can be effectively avoided.

Figure 2:
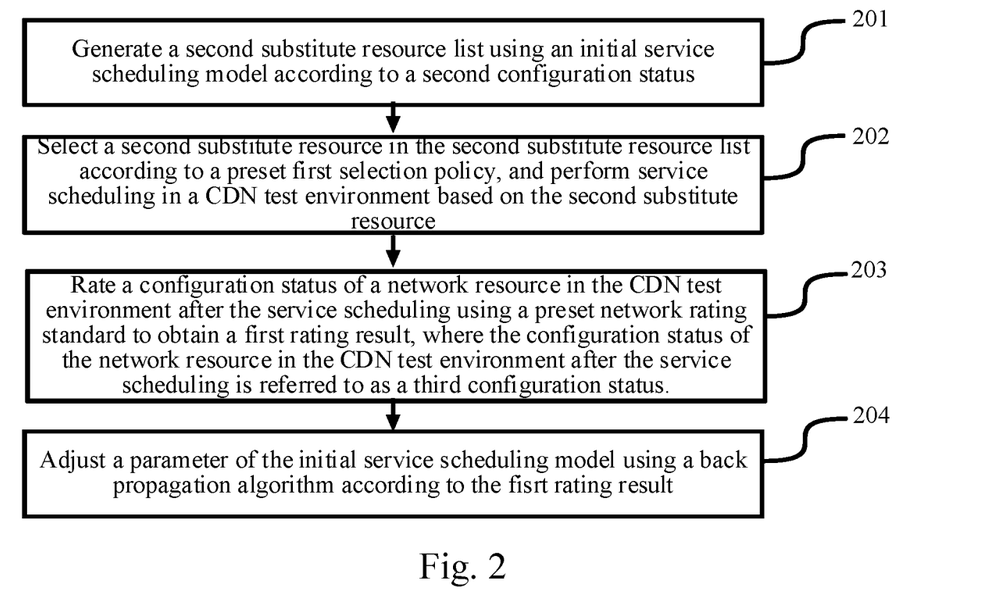
FIG. 2 is a flowchart of a method for training a service scheduling model according to an embodiment of the present disclosure.

Optionally, training of the service scheduling model may include the following steps as shown in FIG. 2.

Step 201: the second substitute resource list is generated using the initial service scheduling model according to the second configuration status.

During implementation, after obtaining the current configuration status of the network resource in the CDN test environment, where the current configuration status of the network resource in the CDN test environment is referred to as the second configuration status, the management device may obtain a status vector of the current whole network resource configuration based on the second configuration status, and then calls the initial service scheduling model, and uses the status vector as input of the initial service scheduling model to perform calculation using a forward propagation algorithm at a hidden layer of the service scheduling model, so that a second substitute resource list may be obtained from an output layer of the service scheduling model. At least one substitute resource and a weight corresponding to each of the at least one substitute resource are recorded in the second substitute resource list.

Figure 3:
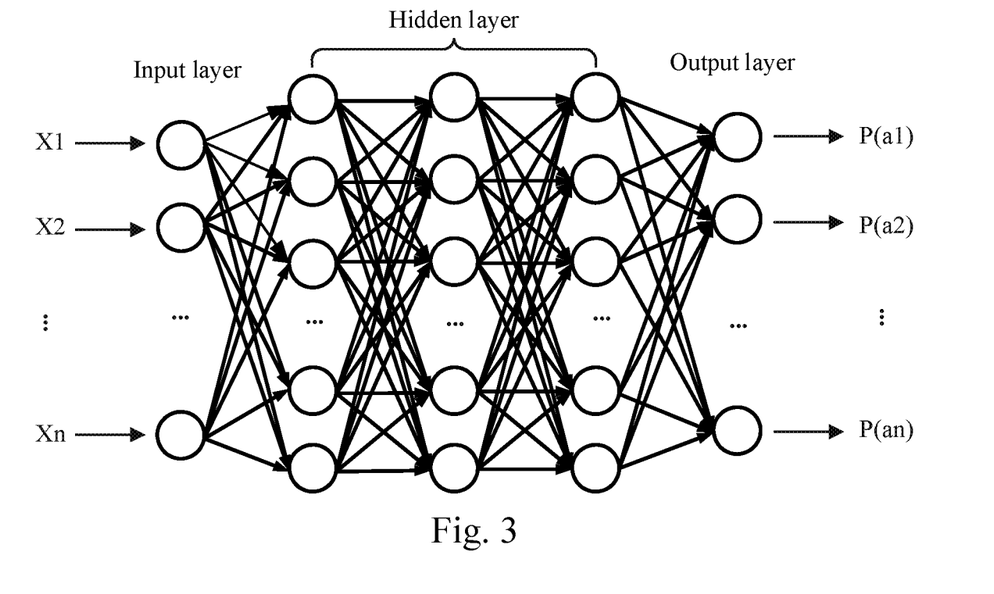
FIG. 3 is a schematic diagram of a deep reinforcement learning network architecture according to an embodiment of the present disclosure.

A structure of the service scheduling model can refer to a deep reinforcement learning network architecture shown in FIG. 3. An input layer is a status vector, an output layer is a weight of a substitute resource, and a hidden layer is linear or nonlinear neurons calculation. The service scheduling model may be calculated based on an initialization parameter and a status vector input by the input layer through forward propagation calculation at the hidden layer, so that the output layer outputs a weight. A corresponding calculation formula may be as follows:

$$z_i^{l+1} = \Sigma_{j=1}^n W_{ij}^n x_j + b_i^l$$

$$a_i^{l+1} = f(z_i^{l+1})$$

$z_i^{l+1}$ represents an input weight sum of an $i^{th}$ unit at an $(l+1)^{th}$ layer, $x_1, x_2, \ldots, x_n$ are input units, $b_i^l$ is a bias unit of an $i^{th}$ unit at an $l^{th}$ layer, and $W_{ij}^l$ is a connection weight between a $j^{th}$ unit at an $l^{th}$ layer and an $i^{th}$ unit at an $(l+1)^{th}$ layer. $a_i^{l+1}$ represents an activation value of an $i^{th}$ unit at an $(l+1)^{th}$ layer (that is, the foregoing weight corresponding to the substitute resource), and $f(\cdot)$ is an activation function such as sigmoid or tanh.

Step 202: a second substitute resource is selected in the second substitute resource list according to the preset first selection policy, and service scheduling is performed in the CDN test environment based on the second substitute resource.

During implementation, after obtaining the second substitute resource list using the service scheduling model, the management device may select the second substitute resource in the second substitute resource list according to a weight corresponding to each substitute resource recorded in the second substitute resource list and the preset first selection policy. Then, the management device may perform service scheduling based on the second substitute resource in the CDN test environment. It is worth mentioning that, in the training phase of the service scheduling model, accuracy of a weight of each substitute resource in the second substitute resource list cannot be ensured. Therefore, the selected second substitute resource may not be an actual optimal substitute resource.

Step 203: a configuration status of a network resource in the CDN test environment after the service scheduling is rated using a preset network rating standard to obtain a first rating result, where the configuration status of the network resource in the CDN test environment after the service scheduling is referred to as a third configuration status.

During implementation, a management technician may establish a network quality rating standard based on multi-dimensional data such as a bandwidth status, a service capability, a user coverage, and a response time, and the like of a network node, and may further establish a network cost rating standard based on multi-dimensional data such as a planning status, a charging type, and a charging coefficient, and the like of a network node. In particular, quality may be first rated from a network resource perspective, for example, quality of an individual node server, quality of a service cluster, and the like, may be rated, and quality may be further rated from a user perspective, for example, a user response time, and the like. Then quality scores in the two dimensions are comprehensively analyzed. Then a cost score currently generated in the CDN is calculated using the charging unit (such as a single network node) according to different charging types and charging coefficients, and finally a network rating standard may be generated based on both the quality score and the cost score, and the network rating standard is stored in the management device.

In this way, after the service scheduling is performed based on the second substitute resource, the management device may rate the configuration status of the network resource in the CDN test environment after the service scheduling using the preset network rating standard, where the configuration status of the network resource in the CDN test environment after the service scheduling is referred to as the third configuration status.

Step 204: the parameter of the preset service scheduling model is adjusted using a back propagation algorithm according to the first rating result.

During implementation, after obtaining the first rating result of the configuration status of the network resource in the CDN test environment after the scheduling, the management device may adjust the parameter of the preset service scheduling model using the back propagation algorithm. The back propagation algorithm may be as follows:

Formula 1, which is used to calculate an error generated in calculation at a last layer of the service scheduling model:

$$\delta^L = \nabla_a C \odot \sigma'(z^L)$$

Formula 2, which is used to calculate an error generated in calculation at each layer of the service scheduling model:

$$\delta^l = ((w^{l+1})^T \delta^{l+1}) \odot \sigma'(z^l)$$

Formula 3, which is used to calculate a gradient of a weight:

$$\frac{\partial C}{\partial w_{jk}^l} = a_k^{l-1} \delta_j^l$$

Formula 4, which is used to calculate a gradient of a bias:

$$\frac{\partial C}{\partial b_j^l} = \delta_j^l$$

L represents a last layer of the hidden layer, C represents a true error between an output value of the model and a standard value, $\delta^L$ represents a calculated error at the last layer, $\delta^l$ represents a calculated error at a first layer, $\odot$ is a Hadamard product, $\nabla_a C$ represents a derivative of the error at the last layer which is output by a unit at the last layer, $\sigma'(z^L)$ represents a derivative of an activation function which is input to the unit at the last layer, and $\sigma'(z^l)$ represents a derivative of the activation function which is input to the unit at the first layer.

Optionally, similar to the training phase, after the service scheduling is performed in the whole CDN in step 104, the scheduling result may be rated to obtain a second rating result, and then the parameter is adjusted based on the second rating result. Corresponding processing may be as follows: a configuration status of a network resource in the whole CDN after the service scheduling is rated using a preset network rating standard to obtain a second rating result, where the configuration status of the network resource in the whole CDN after the service scheduling is referred to as a fourth configuration status, and the parameter of the service scheduling model is adjusted using the back propagation algorithm according to the second rating result.

During implementation, after performing the service scheduling in the whole CDN based on the first substitute resource, the management device may obtain the configuration status of the network resource in the whole CDN after the service scheduling, where the configuration status of the network resource in the whole CDN after the service scheduling is referred to as the fourth configuration status, and then may rate the fourth configuration status based on the preset network rating standard to obtain a second rating result. Then the parameter of the service scheduling model may be adjusted according to the second rating result using the back propagation algorithm.

In this way, in the service scheduling model, a complex problem in the whole CDN environment can be effectively represented with a high abstraction capability of a deep neural network, and the parameter of the model is updated according to a feedback of the network rating standard through the back propagation algorithm. Therefore, after learning for a specific time period, a global optimal solution can be selected through comprehensive consideration of a service scheduling problem. In the training phase, if scheduling is triggered, the configuration status of the network resource in the CDN test environment is set as input of the model, and a second substitute resource list is output from the model based on a current parameter. Then a substitute resource is selected according to a specific selection policy, and then a serving status of the substitute resource is evaluated using the network rating standard and fed back to the model. After the model receives the feedback, the parameter of the model is adjusted according to the back propagation algorithm, so that subsequent scheduling can proceed toward a global optimal direction. When the training is performed for specific iteration times or a training result meets a predetermined condition, a service scheduling model with relatively good performance can be generated. Then the service scheduling model may be applied to the whole CDN environment, and learning is continued during subsequent operation. In other words, when a scheduling trigger event occurs, the service scheduling model may be used to select a substitute resource that is expected to have a positive impact on the future and that can continue executing the service, and the selected substitute resource may be evaluated using the network rating standard, so that the parameter of the service scheduling model may be further adjusted based on the second rating result.

In this embodiment of the present disclosure, the current configuration status of the network resource in the whole CDN is obtained when the preset scheduling trigger event is detected, where the current configuration status of the network resource in the whole CDN is referred to as the first configuration status, the first substitute resource list is generated according to the first configuration status using the trained service scheduling model, where the at least one substitute resource and the weight corresponding to each of the at least one substitute resource are recorded in the first substitute resource list, the first substitute resource is selected in the first substitute resource list according to the weight corresponding to each of the at least one substitute resource and the preset first selection policy, and the service scheduling is performed in the whole CDN based on the first substitute resource. In this way, through continuous learning on a service scheduling process and a service scheduling result feedback, selection of a substitute resource may be understood and mastered, so that inaccuracy, maintenance difficulty, and cost fluctuation, and the like caused by manually specifying a scheduling rule are avoided. In addition, during service scheduling, the management device directly selects an optimal substitute resource through the service scheduling model without a need of a large amount of manual work, so that t efficiency of the service scheduling can be improved.

Figure 4:
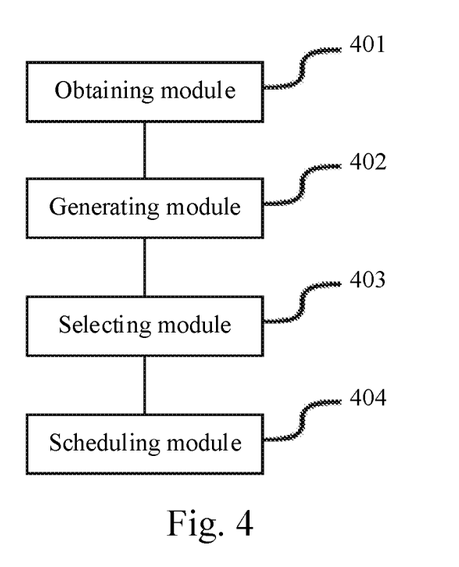
FIG. 4 is a schematic structural diagram of an apparatus for scheduling a service according to an embodiment of the present disclosure.

Based on the same technical concept, an embodiment of the present disclosure further provides an apparatus for scheduling a service. As shown in FIG. 4, the apparatus includes:

an obtaining module 401 configured to obtain a current configuration status of a network resource in a whole CDN when a preset scheduling trigger event is detected, where the current configuration status of the network resource in the whole CDN is referred to as the first configuration status;

a generating module 402 configured to generate a first substitute resource list according to the first configuration status using a trained service scheduling model, where at least one substitute resource and a weight corresponding to each of the at least one substitute resource are recorded in the first substitute resource list;

a selecting module 403 configured to select a first substitute resource in the first substitute resource list according to the weight corresponding to each of the at least one substitute resource and a preset first selection policy; and a scheduling module 404 configured to perform service scheduling in the whole CDN based on the first substitute resource.

Optionally, the obtaining module 401 is further configured to obtain a current configuration status of a network resource in a CDN test environment when a preset scheduling trigger event is detected in the CDN test environment, where the CDN test environment is a local CDN and/or a whole virtual CDN and the current configuration status of the network resource in the CDN test environment is referred to as a second configuration status.

Figure 5:
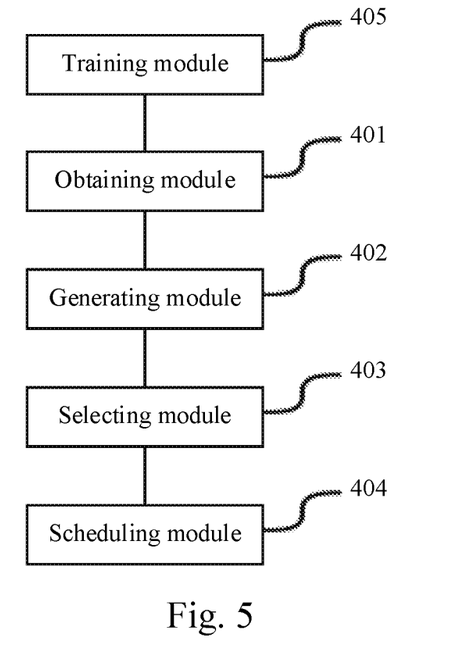
FIG. 5 is a schematic structural diagram of an apparatus for scheduling a service according to an embodiment of the present disclosure.

As shown in FIG. 5, the apparatus further includes a training module 405 configured to train an initial service scheduling model based on the second configuration status to adjust a parameter of the initial service scheduling model.

Optionally, the training module 405 is configured to:

generate the second substitute resource list using the initial service scheduling model according to the second configuration status;

select a second substitute resource in the second substitute resource list according to the first selection policy, and perform service scheduling in the CDN test environment based on the second substitute resource;

rate a configuration status of a network resource in the CDN test environment after the service scheduling using a preset network rating standard to obtain a first rating result, where the configuration status of the network resource in the CDN test environment after the service scheduling is referred to as a third configuration status; and adjust the parameter of the initial service scheduling model using a back propagation algorithm according to the first rating result.

Figure 6:
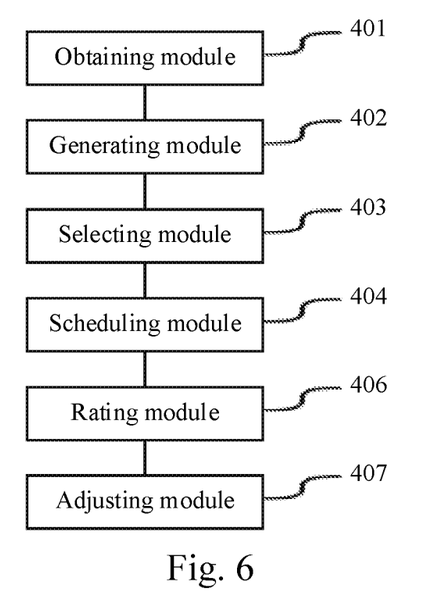
FIG. 6 is a schematic structural diagram of an apparatus for scheduling a service according to an embodiment of the present disclosure.

Optionally, as shown in FIG. 6, the apparatus further includes:

a rating module 406 configured to: after the service scheduling is performed in the whole CDN, rate a configuration status of a network resource in the whole CDN after the service scheduling using a preset network rating standard to obtain a second rating result, where the configuration status of the network resource in the whole CDN after the service scheduling is referred to as a fourth configuration status; and an adjusting module 407 configured to adjust a parameter of the service scheduling model using a back propagation algorithm according to the second rating result.

Optionally, the obtaining module 401 is configured to:

determine a scheduling trigger probability using a trained fault alarming model when an abnormality is detected in a status parameter of a first network resource in the whole CDN; and generate a random number between 0 and 1, and obtain the current configuration status of the network resource in the whole CDN when the random number is less than or equal to the scheduling trigger probability.

Figure 7:
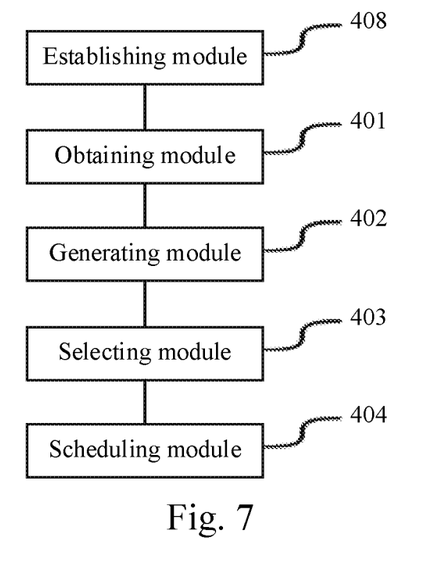
FIG. 7 is a schematic structural diagram of an apparatus for scheduling a service according to an embodiment of the present disclosure.

Optionally, as shown in FIG. 7, the apparatus further includes:

an establishing module 408 configured to calculate and establish the fault alarming model in a Markov chain form according to historical fault alarm data of the whole CDN.

In this embodiment of the present disclosure, the current configuration status of the network resource in the whole CDN is obtained when the preset scheduling trigger event is detected, where the current configuration status of the network resource in the whole CDN is referred to as a first configuration status, and the first substitute resource list is generated according to the first configuration status using the trained service scheduling model, where the at least one substitute resource and the weight corresponding to each of the at least one substitute resource are recorded in the first substitute resource list, the first substitute resource is selected in the first substitute resource list according to the weight corresponding to each of the at least one substitute resource and the preset first selection policy, and the service scheduling is performed in the whole CDN based on the first substitute resource. In this way, through continuous learning on a service scheduling process and a service scheduling result feedback, selection of a substitute resource may be understood and mastered, so that inaccuracy, maintenance difficulty, and cost fluctuation, and the like caused by manually specifying a scheduling rule are avoided. In addition, during service scheduling, the management device directly selects an optimal substitute resource through the service scheduling model without a need of a large amount of manual work, so that efficiency of the service scheduling can be improved.

It should be noted that, division of the foregoing functional modules are only described as an example when the apparatus for scheduling a service in the foregoing embodiments performs service scheduling. In an actual application, the foregoing functions may be allocated and implemented by different functional modules according to needs, that is, an internal structure of the apparatus is divided into different functional modules to implement all or some of the foregoing described functions. In addition, the apparatus for scheduling a service in the foregoing embodiments and the method for scheduling a service in the foregoing embodiments are based on the same concept. For a specific implementation process, refer to the method embodiments, and details are not described herein again.

Figure 8:
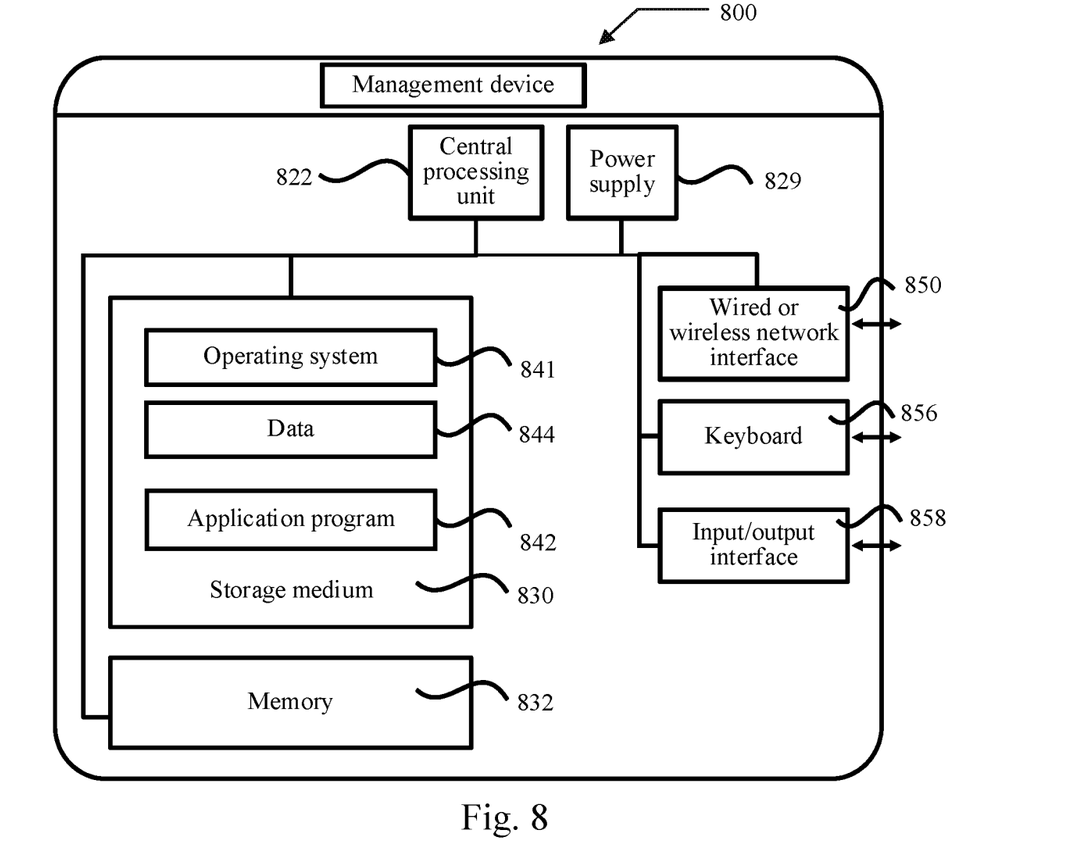
FIG. 8 is a schematic structural diagram of a management device according to an embodiment of the present disclosure.

FIG. 8 is a schematic structural diagram of a management device according to an embodiment of the present disclosure. The management device 800 may vary greatly due to different configurations or performance, and may include one or more central processors 822 (for example, one or more processors) and a memory 832, and one or more storage media 830 (for example, one or more mass storage devices) that store application programs 842 or data 844. The memory 832 and the storage medium 830 may be transient or persistent storages. The program stored in the storage medium 830 may include one or more modules (not shown), and each module may include a series of instructions and operations for the server. Still further, the central processing unit 822 may be configured to: communicate with the storage medium 830, and perform, on the management device 800, the series of instructions and operations in the storage medium 830.

The management device 800 may further include one or more power supplies 826, one or more wired or wireless network interfaces 850, one or more input/output interfaces 858, one or more keyboards 856, and/or, one or more operating systems 841, for example, WindowsServer™, MacOSX™, Unix™, Linux™, and FreeBSD™.

The management device 800 may include a memory and one or more programs, where the one or more programs are stored in the memory, and the management device 800 is configured so that the one or more processors execute the one or more programs, which includes instructions for performing the above method for scheduling a service.

A person of ordinary skill in the art may understand that all or some of the steps of the foregoing embodiments may be implemented by using hardware, or may be implemented by a relevant hardware instructed by a program. The program may be stored in a computer readable storage medium. The storage medium may be a read-only memory, a magnetic disk, an optical disc, or the like.

The foregoing descriptions are merely preferred embodiments of the present disclosure, but are not intended to limit the present disclosure. Any modification, equivalent replacement, or improvement made within the spirit and the principle of the present disclosure shall fall within the protection scope of the present disclosure.

What is claimed is:

1. A method for scheduling a service, comprising:
   obtaining a first configuration status when a preset scheduling trigger event is detected, the first configuration status being a current configuration status of each of at least one network resource in a whole content delivery network (CDN);
   generating a first substitute resource list according to the first configuration status using a trained service scheduling model, wherein at least one substitute resource and a weight corresponding to each of the at least one substitute resource are recorded in the first substitute resource list;
   selecting a first substitute resource in the first substitute resource list according to the weight corresponding to each of the at least one substitute resource and a preset first selection policy; and
   performing service scheduling in the whole CDN based on the first substitute resource;
   wherein obtaining a first configuration status comprises:
   determining a scheduling trigger probability using a trained fault alarming model when an abnormality is detected in a status parameter of a first network resource in the whole CDN; and
   generating a random number between 0 and 1, and obtaining the current configuration status of each of the at least one network resource in the whole CDN when the random number is less than or equal to the scheduling trigger probability.

2. The method according to claim 1, further comprising:
   obtaining a second configuration status, the second configuration status being a current configuration status of each of the at least one network resource in a CDN test environment when a preset scheduling trigger event is detected in the CDN test environment, wherein the CDN test environment is a local CDN and/or a whole virtual CDN; and
   training an initial service scheduling model based on the second configuration status to adjust a parameter of the initial service scheduling model.

3. The method according to claim 2, wherein the training an initial service scheduling model based on the second configuration status to adjust a parameter of the initial service scheduling model comprises:
   generating a second substitute resource list using the initial service scheduling model according to the second configuration status, selecting a second substitute resource in the second substitute resource list according to the preset first selection policy, and performing service scheduling in the CDN test environment based on the second substitute resource; and rating a third configuration status using a preset network rating standard to obtain a first rating result, where the third configuration status is a configuration status of each of the at least one network resource in the CDN test environment after the service scheduling; and
   adjusting the parameter of the initial service scheduling model using a back propagation algorithm according to the first rating result.

4. The method according to claim 1, after the performing service scheduling in the whole CDN, further comprising:
   rating a fourth configuration status of each of the at least one network resource in the whole CDN after the service scheduling using a preset network rating standard to obtain a second rating result, where the fourth configuration status is a configuration status of each of the at least one network resource in the whole CDN after the service scheduling; and
   adjusting a parameter of the service scheduling model using a back propagation algorithm according to the second rating result.

5. The method according to claim 1, further comprising:
   calculating and establishing the fault alarming model in a Markov chain form according to historical fault alarm data of the whole CDN.

6. The method according to claim 1, wherein the fault alarming model is used to predict a probability of fault occurrence and service scheduling based on a bottom-level machine indicator in the whole CDN.

7. The method according to claim 1, wherein the fault alarming model is established according to recent historical fault alarm data of the whole CDN, and is updated continuously based on fault alarm data generated in real time in the whole CDN.

8. The method according to claim 1, wherein a configuration status of partial network resources associated with the service scheduling in the whole CDN is obtained.

9. The method according to claim 1, wherein the service scheduling model is a pre-stored deep reinforcement learning model, on which a plurality of times of learning and training are performed, and which is established in large-scale discrete state-action space.

10. A management device, comprising a processor and a memory storing at least one instruction, at least one program, a code set, or an instruction set that are loaded and executed by the processor to perform a method for scheduling a service;
    wherein the method for scheduling a service comprises:
    obtaining a first configuration status when a preset scheduling trigger event is detected, the first configuration status being a current configuration status of each of at least one network resource in a whole content delivery network (CDN);

generating a first substitute resource list according to the first configuration status using a trained service scheduling model, wherein at least one substitute resource and a weight corresponding to each of the at least one substitute resource are recorded in the first substitute resource list;

selecting a first substitute resource in the first substitute resource list according to the weight corresponding to each of the at least one substitute resource and a preset first selection policy; and performing service scheduling in the whole CDN based on the first substitute resource;

wherein obtaining a first configuration status comprises:
determining a scheduling trigger probability using a trained fault alarming model when an abnormality is detected in a status parameter of a first network resource in the whole CDN; and generating a random number between 0 and 1, and obtaining the current configuration status of each of the at least one network resource in the whole CDN when the random number is less than or equal to the scheduling trigger probability.

11. The management device according to claim 10, further comprising:
obtaining a second configuration status, the second configuration status being a current configuration status of each of the at least one network resource in a CDN test environment when a preset scheduling trigger event is detected in the CDN test environment, wherein the CDN test environment is a local CDN and/or a whole virtual CDN; and training an initial service scheduling model based on the second configuration status to adjust a parameter of the initial service scheduling model.

12. The management device according to claim 11, wherein the training an initial service scheduling model based on the second configuration status to adjust a parameter of the initial service scheduling model comprises:
generating a second substitute resource list using the initial service scheduling model according to the second configuration status, selecting a second substitute resource in the second substitute resource list according to the preset first selection policy, and performing service scheduling in the CDN test environment based on the second substitute resource; and rating a third configuration status using a preset network rating standard to obtain a first rating result, wherein the third configuration status is a configuration status of each of the at least one network resource in the CDN test environment after the service scheduling; and adjusting the parameter of the initial service scheduling model using a back propagation algorithm according to the first rating result.

13. The management device according to claim 10, after the performing service scheduling in the whole CDN, further comprising:
rating a fourth configuration status of each of the at least one network resource using a preset network rating standard to obtain a second rating result, wherein the fourth configuration status is a configuration status of each of the at least one network resource in the whole CDN after the service scheduling; and adjusting a parameter of the service scheduling model using a back propagation algorithm according to the second rating result.

14. The management device according to claim 10, further comprising:
calculating and establishing the fault alarming model in a Markov chain form according to historical fault alarm data of the whole CDN.

15. The management device according to claim 10, wherein the fault alarming model is used to predict a probability of fault occurrence and service scheduling based on a bottom-level machine indicator in the whole CDN.

16. The management device according to claim 10, wherein the fault alarming model is established according to recent historical fault alarm data of the whole CDN, and is updated continuously based on fault alarm data generated in real time in the whole CDN.

17. The management device according to claim 10, wherein a configuration status of partial network resources associated with the service scheduling in the whole CDN is obtained.

18. The management device according to claim 10, wherein the service scheduling model is a pre-stored deep reinforcement learning model, on which a plurality of times of learning and training are performed, and which is established in large-scale discrete state-action space.

* * * * *